US011138166B2

(12) United States Patent
Sun et al.

(10) Patent No.: US 11,138,166 B2
(45) Date of Patent: Oct. 5, 2021

(54) DATABASE TUNING USING A FEDERATED MACHINE LEARNING SYSTEM OF A CENTERLESS NETWORK

(71) Applicant: International Business Machines Corporation, Armonk, NY (US)

(72) Inventors: ShengYan Sun, Beijing (CN); Ke Wei Wei, Beijing (CN); Meng Wan, Beijing (CN); Shuo Li, Beijing (CN); Xiaobo Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 16/550,465

(22) Filed: Aug. 26, 2019

(65) Prior Publication Data

US 2021/0064591 A1 Mar. 4, 2021

(51) Int. Cl.
*G06F 16/21* (2019.01)
*G06F 16/28* (2019.01)
(Continued)

(52) U.S. Cl.
CPC .......... *G06F 16/217* (2019.01); *G06F 16/182* (2019.01); *G06F 16/2237* (2019.01); *G06F 16/285* (2019.01); *G06N 20/00* (2019.01)

(58) Field of Classification Search
CPC .. G06F 16/182; G06F 16/2237; G06F 16/217; G06F 16/285; G06N 20/00
(Continued)

(56) References Cited

U.S. PATENT DOCUMENTS 9,384,220 B2 7/2016 Battaglia et al.
9,881,034 B2 1/2018 Horowitz et al.
(Continued)

FOREIGN PATENT DOCUMENTS

CN 106708840 A 5/2017
EP 3447660 A1 2/2019

OTHER PUBLICATIONS

"Tuning Oracle Database Performance on Database Cloud Service," Administering Oracle Database Cloud Service, Oracle Help Center, copyright 2014, 2019, 2 pages. https://docs.oracle.com/en/cloud/paas/database-dbaas-cloud/csdbi/tune-performance-db.html.
(Continued)

*Primary Examiner* — Kuen S Lu
(74) *Attorney, Agent, or Firm* — Yee & Associates, P.C.

(57) ABSTRACT

Database configuration tuning is provided. A set of database nodes having similar data factors is selected in a centerless network of database nodes. Configuration models corresponding to the set of database nodes are trained using data parallelism. Trained configuration models corresponding to the set of database nodes are combined to form a federated configuration model. It is determined whether performance indicators corresponding to the set of database nodes are greater than a performance threshold level. In response to determining that the performance indicators corresponding to the set of database nodes are greater than the performance threshold level, a database configuration corresponding to the federated configuration model is recommended to a new database node. The new database node is joined to the centerless network.

25 Claims, 15 Drawing Sheets

(51) Int. Cl.
   *G06N 20/00* (2019.01)
   *G06F 16/182* (2019.01)
   *G06F 16/22* (2019.01)

(58) Field of Classification Search
   USPC ........................................................ 707/790
   See application file for complete search history.

(56) References Cited

U.S. PATENT DOCUMENTS

| | | | |
|---|---|---|---|
| 10,896,176 B1* | 1/2021 | Creedon | G06F 16/24542 |
| 2003/0055529 A1* | 3/2003 | Aosawa | H04L 41/0883 |
| | | | 700/220 |
| 2005/0170892 A1* | 8/2005 | Atkinson | G07F 17/32 |
| | | | 463/42 |
| 2012/0101801 A1 | 4/2012 | Van Dorsselaer | |
| 2013/0179862 A1 | 7/2013 | Kinder et al. | |
| 2015/0271014 A1* | 9/2015 | Madama | H04L 41/0893 |
| | | | 709/222 |
| 2019/0392353 A1* | 12/2019 | Liu | G06N 5/003 |

OTHER PUBLICATIONS

Zhang et al., "An End-to-End Automatic Cloud Database Tuning System Using Deep Reinforcement Learning," SIGMOD '19 Proceedings of the 2019 International Conference on Management of Data, Amsterdam, Netherlands, Jun. 30-Jul. 5, 2019, 18 pages. http://dbgroup.cs.tsinghua.edu.cn/ligl/papers/sigmod19-cdbtune.pdf.

Mell et al., "The NIST Definition of Cloud Computing", Computer Security Division, National Institute of Standards and Technology, Jan. 2011, 7 pages.

PCT Search Report and Written Opinion, dated Dec. 9, 2020, regarding Application No. PCT/IB2020/057926, 9 pages.

* cited by examiner

DATABASE TUNING USING A FEDERATED MACHINE LEARNING SYSTEM OF A CENTERLESS NETWORK

BACKGROUND

1. Field

The disclosure relates generally to database tuning and more specifically to tuning a configuration of a database node using a federated machine learning system of a self-organized, centerless network of a plurality of database nodes.

2. Description of the Related Art

Database tuning describes a group of activities used to optimize the performance of a database. Database tuning usually overlaps with query tuning, but refers to design of the database files, selection of the database management system application, and configuration of the database's environment (e.g., operating system, central processing unit, buffer pool, and the like). Database tuning aims to maximize use of system resources to perform work as efficiently and rapidly as possible. Most database systems are designed to manage their use of system resources, but there is still much room to improve their efficiency by customizing their settings and configuration for the database.

Database tuning is one of the most important aspects of database maintenance. A database administrator will try to figure out the best configuration for different database optimizations. Many databases of different enterprises are deployed on a cloud platform that has a fast-deployment feature to help agile installation.

Database buffer pools cache entries and their attributes. If the entries are in cache, the search time reduces when querying for the cached data. Tuning a database buffer pool is one of the more significant types of database performance tuning. A buffer pool is a data cache between the Lightweight Directory Access Protocol (LDAP) and the physical database files for both tables and indexes. If entries and their attributes are not found in the buffer pool cache, the server searches storage, such as, for example, a set of one or more hard disk drives, for the values. A buffer pool is tuned when the database is initially loaded and when the database size changes significantly.

A database administrator must initialize the database configuration based on personal experience or refer to database configurations of existing databases. This requires the database administrator to have a good understanding of database tuning. However, this does not work well when the database administrator lacks experience. In addition, some databases may provide an auto-analysis feature to auto-fill the database configuration by utilizing a local database optimization record. However, historical optimization data may not be abundantly available for a new database tuning, especially when the tuning is for a newly deployed database on a cloud platform.

SUMMARY

According to one illustrative embodiment, a computer-implemented method for database configuration tuning is provided. The computer selects a set of database nodes having similar data factors in a centerless network of database nodes. The computer trains configuration models corresponding to the set of database nodes using data parallelism. The computer combines trained configuration models corresponding to the set of database nodes to form a federated configuration model. The computer determines whether performance indicators corresponding to the set of database nodes are greater than a performance threshold level. In response to the computer determining that the performance indicators corresponding to the set of database nodes are greater than the performance threshold level, the computer recommends a database configuration corresponding to the federated configuration model to a new database node. The computer joins the new database node to the centerless network. According to other illustrative embodiments, a computer system and computer program product for database configuration tuning are provided. Thus, the different illustrative embodiments provide one or more technical solutions that overcome a technical problem with tuning configurations of database nodes in a centerless network of database nodes to increase database performance.

Further, the computer also identifies a set of data factors corresponding to each database node in the centerless network of database nodes. The computer generates a vector for each database node based on the set of data factors corresponding to each database node. The computer calculates vector relationships between the database nodes in the centerless network based on the generated vector corresponding to each respective database node. The computer generates a node relationship table for each database node in the centerless network listing neighbor database nodes, data factors, and vector relationships corresponding to each respective database node. The computer builds the centerless network that includes the database nodes organized into a plurality of virtual database node groups, each virtual database node group based on the generated node relationship table corresponding to each respective database node. Thus, the computer dynamically builds the centerless network in real time providing increased performance to each database node group.

DETAILED DESCRIPTION

Figure 1:
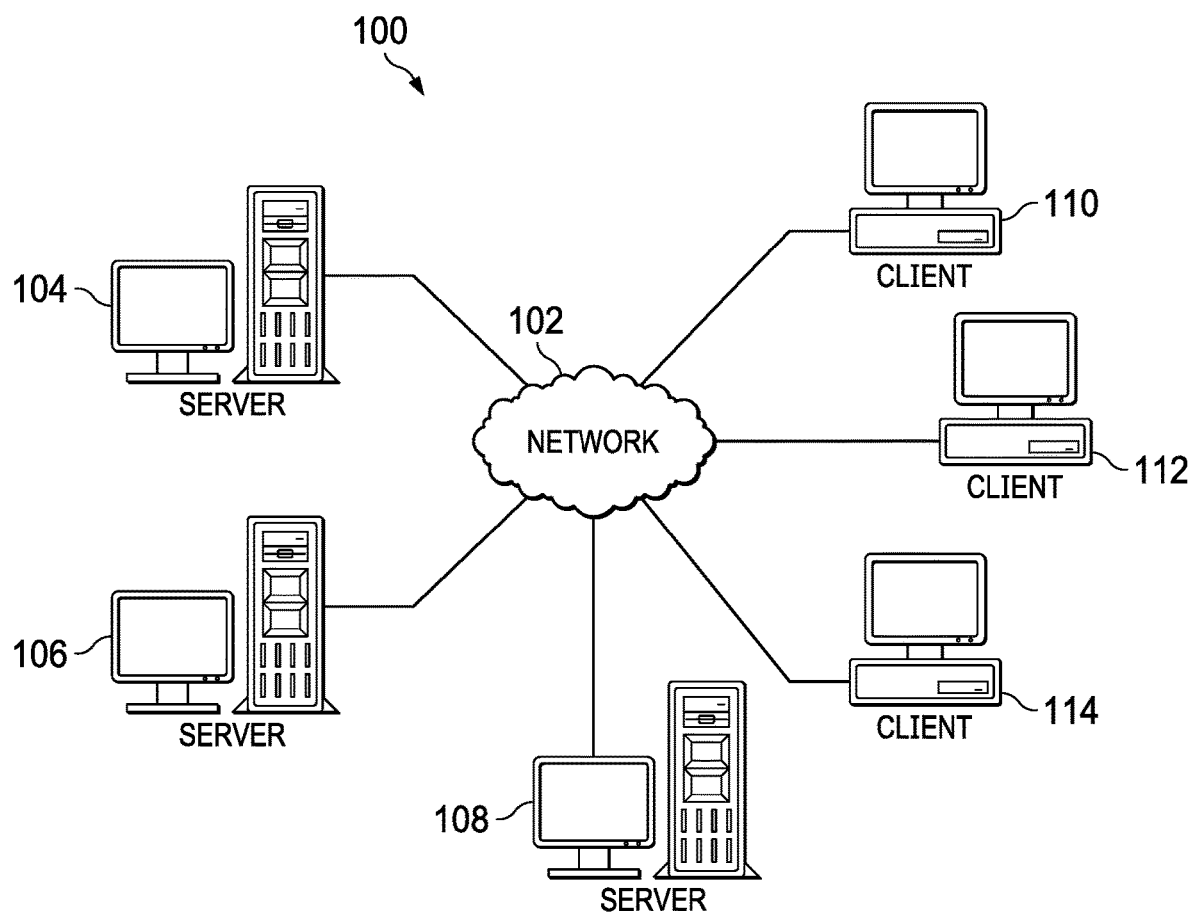
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104, server 106, and server 108 connect to network 102. Server 104, server 106, and server 108 may be, for example, server computers with high-speed connections to network 102. In addition, server 104, server 106, and server 108 may be database nodes that provide data storage services for one or more entities, such as, for example, enterprises, organizations, agencies, institutions, and the like. Also, it should be noted that server 104, server 106, and server 108 may each represent a group of multiple database nodes in a cloud platform or environment. Alternatively, server 104, server 106, and server 108 may each represent clusters of database nodes in a data center.

Client 110, client 112, and client 114 also connect to network 102. Clients 110, 112, and 114 are clients of server 104, server 106, and server 108. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, and the like. Users of clients 110, 112, and 114 may utilize clients 110, 112, and 114 to access and perform operations on data stored in server 104, server 106, and server 108.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

Figure 2:
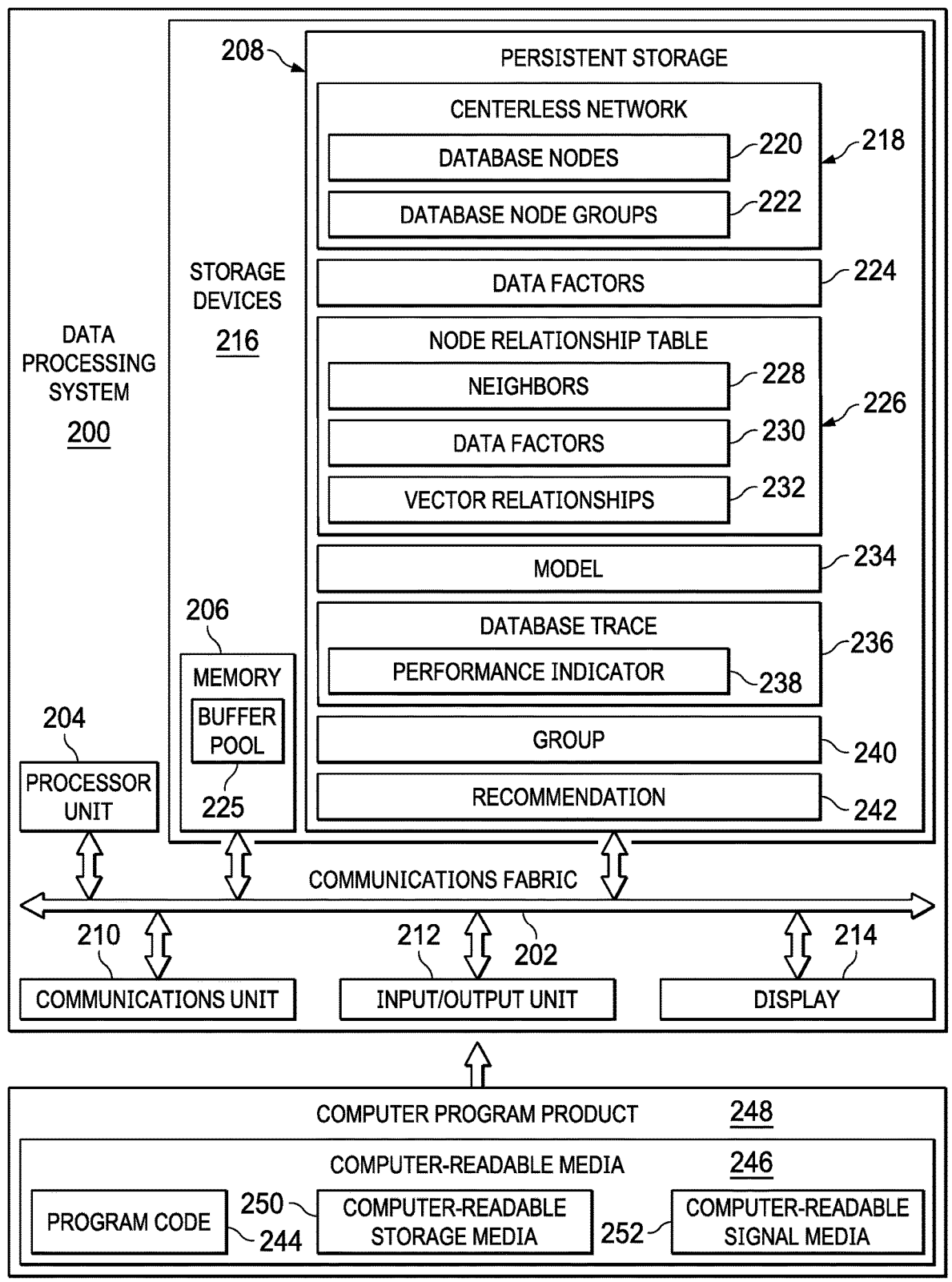
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, a rewritable magnetic tape, or some combination of the above. The media used by persistent storage 208 may be removable. For example, a removable hard drive may be used for persistent storage 208.

In this example, data processing system 200 is one of a plurality of database nodes running in a cloud platform. Centerless network 218 represents an identifier of a self-adapting, centerless network of database nodes 220 that data processing system 200 is coupled with. Self-adapting and centerless means that each database node in the network is changing and reorganizing its virtual group of database nodes based on changing data factors and database node relationships. Database nodes 220 represent identifiers of the plurality of database nodes that data processing system 200 is coupled with in the cloud platform. Database node groups 222 represent the different virtual groups of database nodes that each database node in database nodes 220 has built or formed for generating a federated database configuration model to provide database configuration tuning recommendations to existing and new database nodes in the cloud platform. The database configuration tuning recommendations may be, for example, recommendations to tune buffer pool configurations to increase performance.

Data factors 224 represent a set of one or more data factors, such as, for example, table cardinality, page number, access frequency, index level, leaf page, input/output speed, system cache, and the like, which correspond to the configuration of data processing system 200. For example, data factors 224 affect the configuration of buffer pool 225 in memory 206. Buffer pool 225 is a portion of memory 206 used for caching table and index data pages as they are modified or read from disk, such as persistent storage 208. In other words, buffer pool 225 reduces database file input/output and improves response time for data retrieval.

Node relationship table 226 represents a stored table of relationships between data processing system 200 and other database nodes in the cloud platform. In this example, node relationship table 226 includes neighbors 228, data factors 230, and vector relationships 232. Neighbors 228 represent a list of a selected number of database nodes in the cloud platform. The number of neighbor database nodes is a subset of all other database nodes and not all of the others. Every database node selects the number of neighbors according to its own calculation threshold. Data processing system 200 selects close neighbors based on corresponding data factors 230 and values listed in vector relationships 232. In other words, the greater the vector relationship value, the more the corresponding database node is considered as a close neighbor to data processing system 200. Thus, the database node having the highest vector relationship value is the closest neighbor to data processing system 200.

Vector relationships 232 are based data factors 230. Data factors 230 represent the set data factors corresponding to each respective database node listed in neighbors 228. In other words, each respective database node listed in neighbors 228 may include a different set of data factors. However, it should be noted that in order for a database node to have a high vector relationship value with regard to data processing system 200, that particular database node has to have a same or similar set of data factors as data factors 224, which corresponds to data processing system 200.

Model 234 represents a database configuration model corresponding to data processing system 200. Data processing system 200 generates model 234 based on collected values corresponding to data factors 224. Data processing system 200 evaluates model 234 by running database trace 236. Database trace 236 monitors and records specific activity within running data processing system 200.

Database trace 236 includes performance indicator 238. Performance indictor 238 represents a real time level of performance of data processing system 200, especially with regard to the performance of buffer pool 225 as currently configured. Data processing system 200 compares performance indicator 238 to a defined performance threshold level to determine whether the current configuration of data processing system 200 is optimal or not. For example, if data processing system 200 determines that performance indicator 238 is below the defined performance threshold level, then data processing system 200 determines that the current configuration of data processing system 200 is suboptimal and needs to be tuned.

Group 240 represents the current virtual group of closest neighbor database nodes corresponding to data processing system 200 in the cloud platform. However, it should be noted that membership of group 240 may change when, for example, new database nodes are added to the cloud platform, existing database nodes are removed, data factors 224 change, data factors 230 change, and the like. Recommendation 242 represents a database configuration tuning recommendation received from one or more other database nodes. Data processing system 200 utilizes recommendation 242 to tune the current configuration of data processing system 200 when performance indicator 238 falls below the defined performance threshold level.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
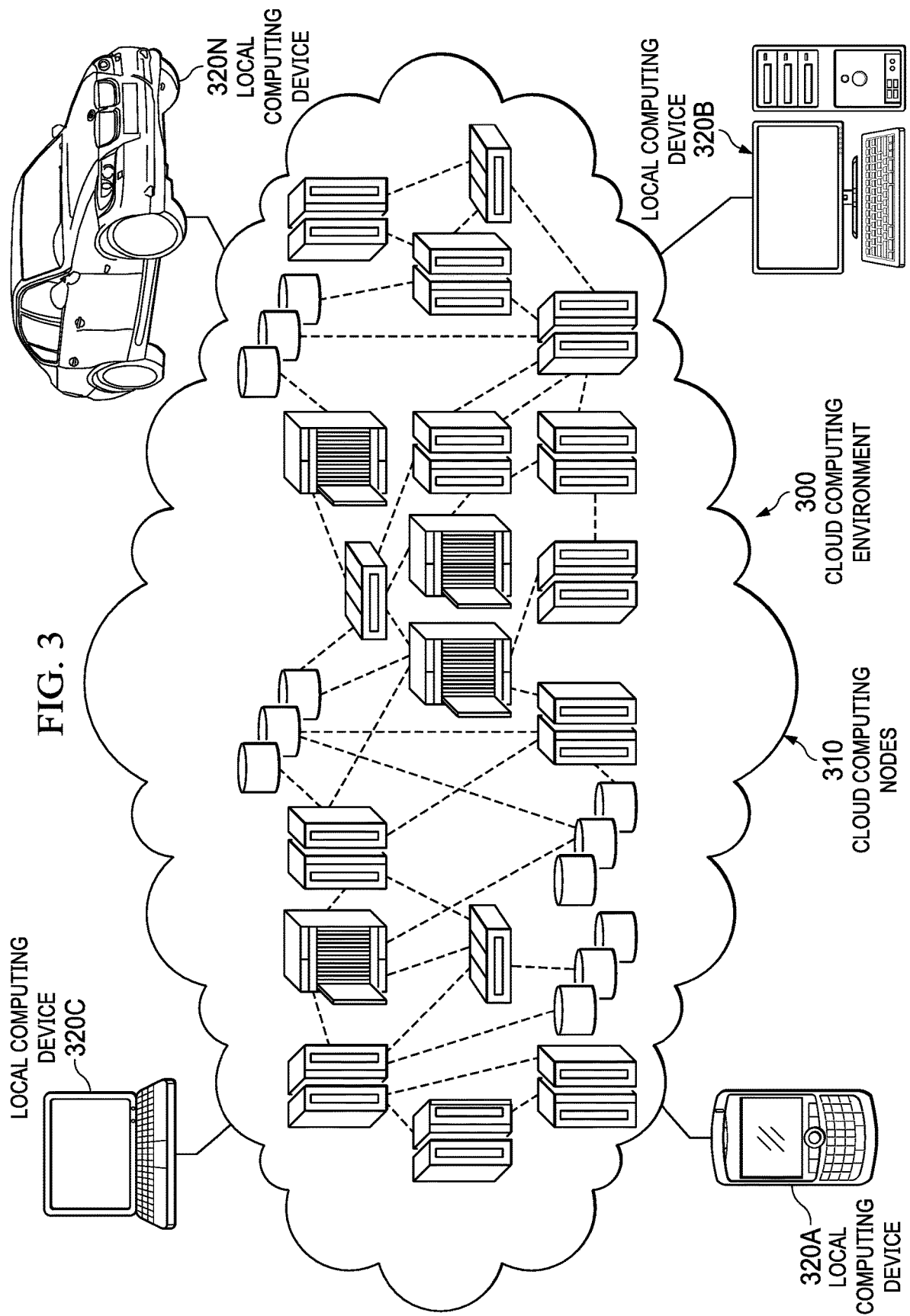
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104, server 106, and server 108 in FIG. 1. Local computing devices 320A-320N may be, for example, client 110, client 112, and client 114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
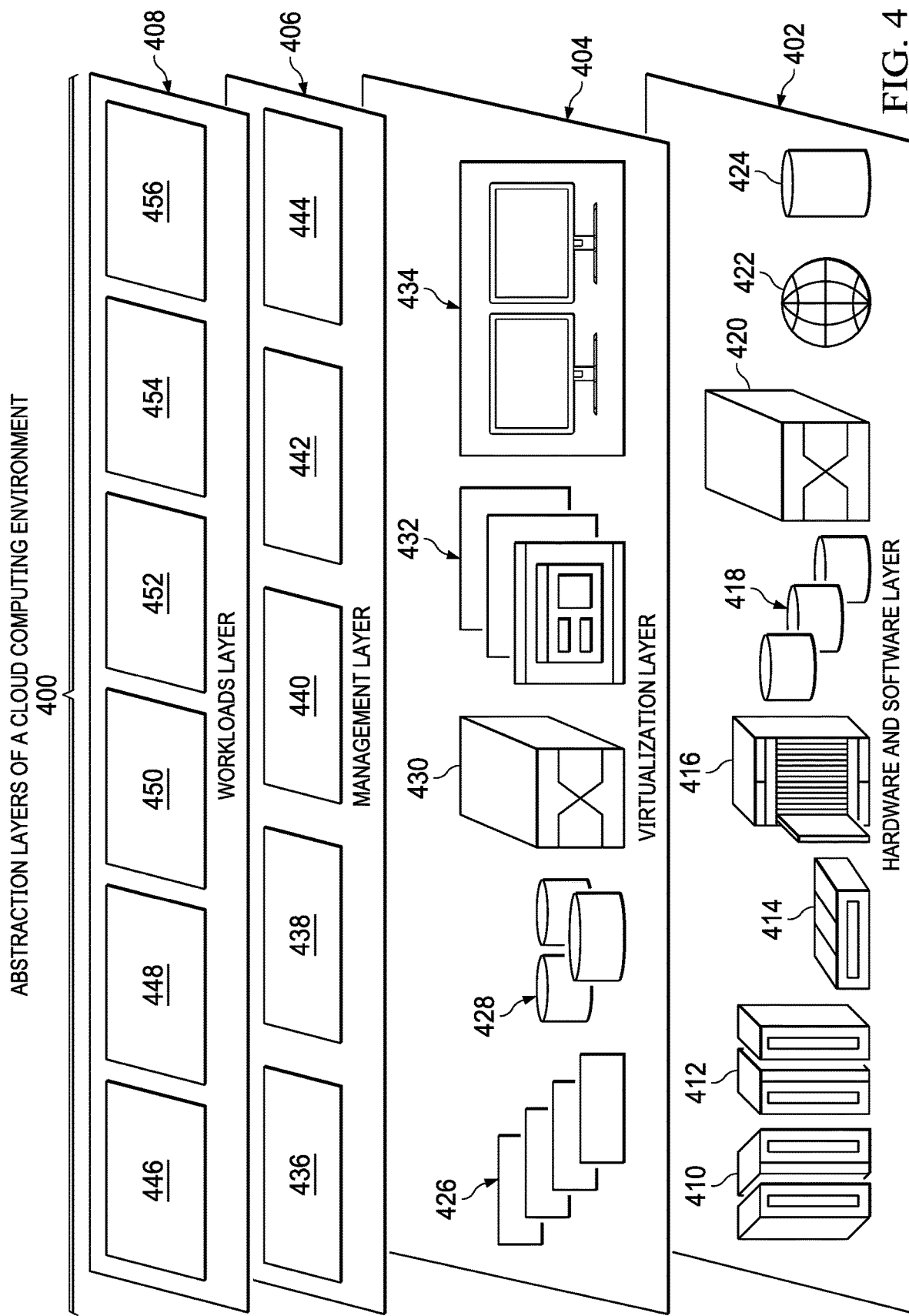
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and database configuration tuning 456.

Currently, database tuning can be performed manually by a database administrator or by some automatic tuning method. Manual database tuning requires the database administrator to utilize the database administrator's knowledge. However, this manual tuning does not work well when the database administrator lacks experience. Automatic database tuning requires the database to utilize automatic tuning based on local database optimization information. However, this requires the database to run for a while so that data factor statistics and database trace data can be collected for automatic local tuning. The data factor statistics are values corresponding to key factors that decide database tuning parameters. The database tuning parameters depend on the data factor statistics or the environment where the database is running. On the other hand, the database administrator can know whether tuning will work well for improving database performance based on the database trace data. Database trace data are good performance feedback for database tuning. However, this method does not work well for a new database without any optimization records.

Illustrative embodiments leverage cloud characteristic and machine learning technology to build a centerless network of database nodes for a cloud platform based on machine learning. The cloud platform includes a multitude of database nodes having different types of data factors. Consequently, a good chance exists for a new database node to get an optimal configuration tuning recommendation from one or more existing database nodes in the cloud platform. The relationship between database nodes depends on similarity of data factors and node-level settings among the database nodes. Sometimes a new database node combines data factors from existing database nodes. Consequently, the new database node should get configuration tuning recommendations from several neighboring database nodes.

Using illustrative embodiments, the new database node searches for the closest neighbor database nodes to get configuration tuning recommendations from. Illustrative embodiments build a dynamic centerless network of database nodes for the new database node as soon as possible to make the new database node's search as efficient as possible. All database nodes in this dynamic centerless network are self-organized and changing all the time.

However, the new database node can extend its search to any database nodes in the cloud platform and dynamically start the search for an optimal set of close neighbor database nodes according to current database trace performance feedback data. Once searched database nodes provide an optimal configuration tuning recommendation based on a federated configuration model, which is a combination of single configuration models corresponding to the searched database nodes, the new database node can stop the search. Alternatively, the new database node can start the search anytime performance indicators corresponding to an older tuning recommendation fall below a defined performance threshold level. As a result, the whole database node network is totally centerless and changing all the time.

Data factor statistics of the new database node are confidential and cannot extend to other database nodes. As a result, single configuration models on searched database nodes must be trained on their own data factor statistics and evaluated using database trace data. Then, illustrative embodiments combine the single configuration models of the searched database nodes into a federated configuration model for a final optimal configuration recommendation for the new database node.

Because database buffer pool configuration tuning is the most common type of database tuning, database buffer pool configuration tuning is used as an example. However, it should be noted that illustrative embodiments may be utilized for other types of database tuning besides buffer pool tuning. As discussed above, the cloud platform contains a multitude of database nodes deployed with different data factors, such as, for example, table cardinality, page number, access frequency, index level, leaf page, input/output speed, system cache, and the like. These data factors affect the database configuration.

Due to data confidentiality restrictions on the database trace data, the database configuration model can only be trained on a single database node. However, the single database configuration model may not be common to the new data of the initialized new database node because the new database node can have different data factors. To solve this issue, illustrative embodiments build a self-organized, centerless network of database nodes, which includes a dynamic group of database nodes for each database node of the cloud platform, to dynamically generate several federated database configuration models. Parameter synchronization modules aggregate searched database nodes' models as sub-federated configuration models by leveraging a parameter synchronization method. In this case, searched database nodes of the new database node will have some data factors statistics saved on local storage, but it is not necessary to get data factor statistics from all database nodes of the cloud platform since some of database nodes may not be close neighbors to the new database node.

The new database node searches close neighbor nodes randomly to calculate a level of relationship between the searched database nodes and the new database node. Then, the new database node can leverage the configuration models of searched database nodes having a close relationship to figure out a configuration recommendation for itself. Afterward, the new database node generates and shares a new relationship table between itself and its associated neighbor database nodes. At the same time, all other database nodes in relationship with the new database node adjust their relationship tables to add information regarding the new database node. However, not all of the database nodes in the cloud platform need to add the new database node to their relationship tables because the new database node is not close to these other database nodes (i.e., these other database nodes are not within a defined vector distance of the new database node).

During the lifecycle of the configuration model of the new database node, the machine learning algorithm of illustrative embodiments monitors the performance indicator in the database trace data of the new database node after illustrative embodiments apply the configuration tuning recommendation to the new database node. If the performance indicator of the new database node falls below the defined performance threshold level, then illustrative embodiments remove the new database node from its joined group of database nodes and find another dynamic group of database nodes to add the new database node to when a better configuration tuning recommendation can be generated from the other dynamic group of database nodes. It should be noted that the statistics or values for the data factors of the new database node will also be changing all the time. Thus, an older configuration recommendation may not fit the new database node very well because of changes in the data factor values. As a result, illustrative embodiments will immediately reorganize the dynamic group of database nodes using other database node neighbors. Consequently, illustrative embodiments will rearrange the whole topology of the self-organized, centerless network to some extent.

Illustrative embodiments regard every database node as a dynamic predictive configuration model that includes its neighbors' data factors. All neighbor database nodes included in the dynamic predictive configuration model contribute to the dynamic output for predicting a new configuration recommendation for added new database nodes. It should be noted that the cloud platform may include any number of database nodes.

Illustrative embodiments identify data factors, such as, for example, table cardinality, page number, access frequency, index level, leaf page, input/output speed, system cache, and the like, which decide the database configuration for a database node. These data factors change during database runtime. Because the database configuration depends on these data factors, a database administrator must timely adjust the database configuration if the database node's performance indicator starts to fall below the defined performance threshold level. However, the machine learning algorithm of illustrative embodiments automatically adjusts the self-organized, centerless network by placing each database node in the cloud platform into a closest dynamic group of database nodes to get a latest configuration recommendation based on a federated configuration model corresponding to each dynamic group. Otherwise, if the size of each database buffer pool is too small, then the LDAP server must wait for database disk activity to satisfy structured query language requests. Conversely, if one or more database buffer pools are too large, then memory (i.e., cache) on the LDAP server may be wasted. If the space used by the database buffer pools is larger than available memory on the server, then operating system paging may occur. Operating system paging may result in increased disk activity.

Illustrative embodiments build the self-organized, centerless network across the database nodes of the cloud platform. All database nodes remain as a dynamic database node for the life of the entire self-organized, centerless network. Further, every database node defines its own distance calculation rule as its standard. This means that a particular database node may consider another database node to be close (i.e., within its defined distance calculation rule or distance threshold), but the other database node may be a long distance (e.g., Euclidean distance) from that particular database node. Illustrative embodiments leverage a vectorization method to determine vector relationships between database nodes. However, it should be noted that alternative illustrative embodiments may utilize other methods to determine database node relationships.

Illustrative embodiments group different data factors into different vectors using mathematics. Illustrative embodiments map every data factor corresponding to a single database node to a dimension of the database node's vector. Once any of the data factors of a database node changes during runtime, illustrative embodiments recalculate the vector of that database node to reflect the correct database node relationship information. Illustrative embodiments utilize the following vector equation:

$$\vec{v} = \sum_{k=0}^{N} \vec{F_k},$$

where $\vec{v}$ is the vector representing the aggregation of data factors corresponding to a particular database node, $\vec{F_k}$ is a sub-vector representing one data factor of the multi-dimension space, and N is the number of data factors corresponding to that particular database node. It should be noted that all of the variables in the equation above can be dynamically changed based on real time system monitoring of the global network, which consists of all the database nodes in the cloud platform.

Furthermore, illustrative embodiments prepare a search list and calculate vector relationships between database nodes. Because all database nodes in the cloud platform are dynamically searching for closest neighbor database nodes, every database node creates a closest neighbor list for future reference. Each database node is flexible enough to search only a portion or a subset of closest neighbor database nodes in the list. After vectorization of the data factors as discussed above, illustrative embodiments calculate vector distance on a vector's included angle. The smaller the angle vectors have, the closer the relationship they have between them. In other words, the smaller the vector distance is, the closer the relationship they have. The distance calculation rule or distance threshold is based on the following vector relationship equation:

$$r(\vec{u},\vec{v}) = 1/d(\vec{u},\vec{v}) = \|\vec{u}-\vec{v}\| = \sqrt{(u_1-v_1)^2+(u_2-v_2)^2...(u_n-v_n)^2}.$$

Because illustrative embodiments calculate the relationship using real time data, illustrative embodiments can specify a dynamic value threshold for each particular database node. When neighbor database nodes' vector relationship values are greater than the dynamic value threshold, then illustrative embodiments consider those neighbor database nodes as good members for a virtual group of database nodes for that particular database node. Otherwise, illustrative embodiments continue the search for closer neighbor database nodes. Thus, every database node temporarily sees a database node relationship map of neighbor database nodes based on node relationship tables.

Thus, illustrative embodiments provide one or more technical solutions that overcome a technical problem with tuning configurations of database nodes in a cloud platform to increase database performance. As a result, these one or more technical solutions provide a technical effect and practical application in the field of database performance in a centerless network of database nodes.

Figure 5:
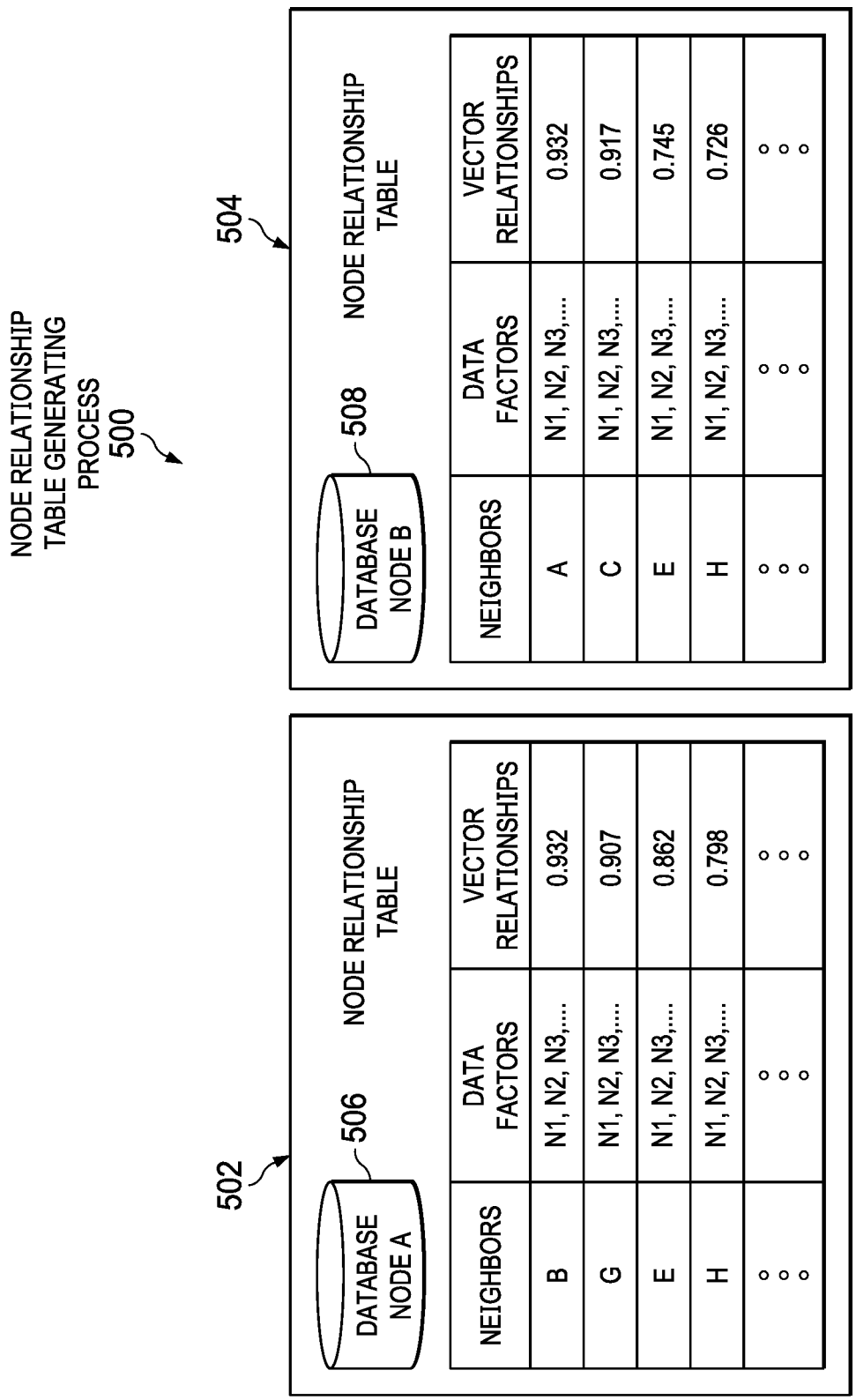
FIG. 5 is a diagram illustrating an example of a node relationship table generating process in accordance with an illustrative embodiment.

With reference now to FIG. 5, a diagram illustrating node relationship table generating process 500 is depicted in accordance with an illustrative embodiment. Node relationship table generating process 500 may be implemented in a network of data processing systems, such as network data processing system 100 in FIG. 1, or a cloud platform, such as cloud computing environment 300 in FIG. 3.

In this example, node relationship table generating process 500 includes node relationship table 502 and node relationship table 504. Node relationship table 502 corresponds to database node A 506 and node relationship table 504 corresponds to database node B 508. Database node A 506 and database node B 508 may be, for example, server 104 and server 106 in FIG. 1.

Database node A 506 and database node B 508 generate node relationship table 502 and node relationship table 504, respectively. The first column ("Neighbors") of the tables lists closest neighbor database nodes. The second column ("Data Factors") lists identified data factors for each of the neighbor database nodes listed in the first column. It should be noted that all data factors are dynamically changing. However, it also should be noted that illustrative embodiments collect values of these data factors when the relationship tables are built. If the data factors change, then the relationships between database nodes change with the changing data factors. The third column ("Vector Relationships") lists vector relationship values, which are based on vectorization of the data factor values listed in the second column, that correspond to each respective database node listed in the first column.

Illustrative embodiments build the self-organized, centerless network of database nodes in the cloud platform using the generated relationship tables. It should be noted that the network of database nodes does not have a center. This means that every database node has a virtual group of database nodes consisting of closest neighbor nodes determined by its respective relationship table. In other words, each database node is regarded as its own base node in its virtual group of database nodes. However, this is not a requirement for every database node. For example, a database node may generate a relationship table when that database node wants to contribute more to the whole database system of the cloud platform. One reason why the database node generates the relationship table is to help new database nodes find an optimal set of closest neighbor database nodes to get an optimal configuration more easily during initial deployment into the cloud platform.

Illustrative embodiments also specify a dynamic threshold based on the relationship table. For example, if a vector relationship between database nodes is too distant (i.e., greater than the dynamic threshold), then that database node does not regard the other database node as a close neighbor. Illustrative embodiments utilize the following mathematical equation to calculate the dynamic value threshold:

$$E = \frac{1}{N}\sum_{i=0}^{N} r_i.$$

where N is a partial number or subset of database nodes listed in the current relationship table. The database node corresponding to the relationship table decides how many database nodes in the table to include in the search list. The database node may set an initial vector relationship threshold to, for example, 0.5. In other words, the database node will only regard database nodes in the relationship table with a vector relationship value greater than or equal to the vector relationship value threshold of 0.5 as candidate members for that database node's virtual group. Then for the next database nodes, if $r_i > E$, then the database node regards the $i_{th}$ database node as a closer neighbor.

Illustrative embodiments stop the search when the size of the relationship table reaches a specified number, such as for example, ten or some other randomly selected number between one and ten. If a new database node cannot get a good configuration tuning recommendation because the generated relationship table does not contain enough candidate members, then illustrative embodiments restart the search and dynamically reorganize the network of database nodes in the cloud platform.

Figure 6:
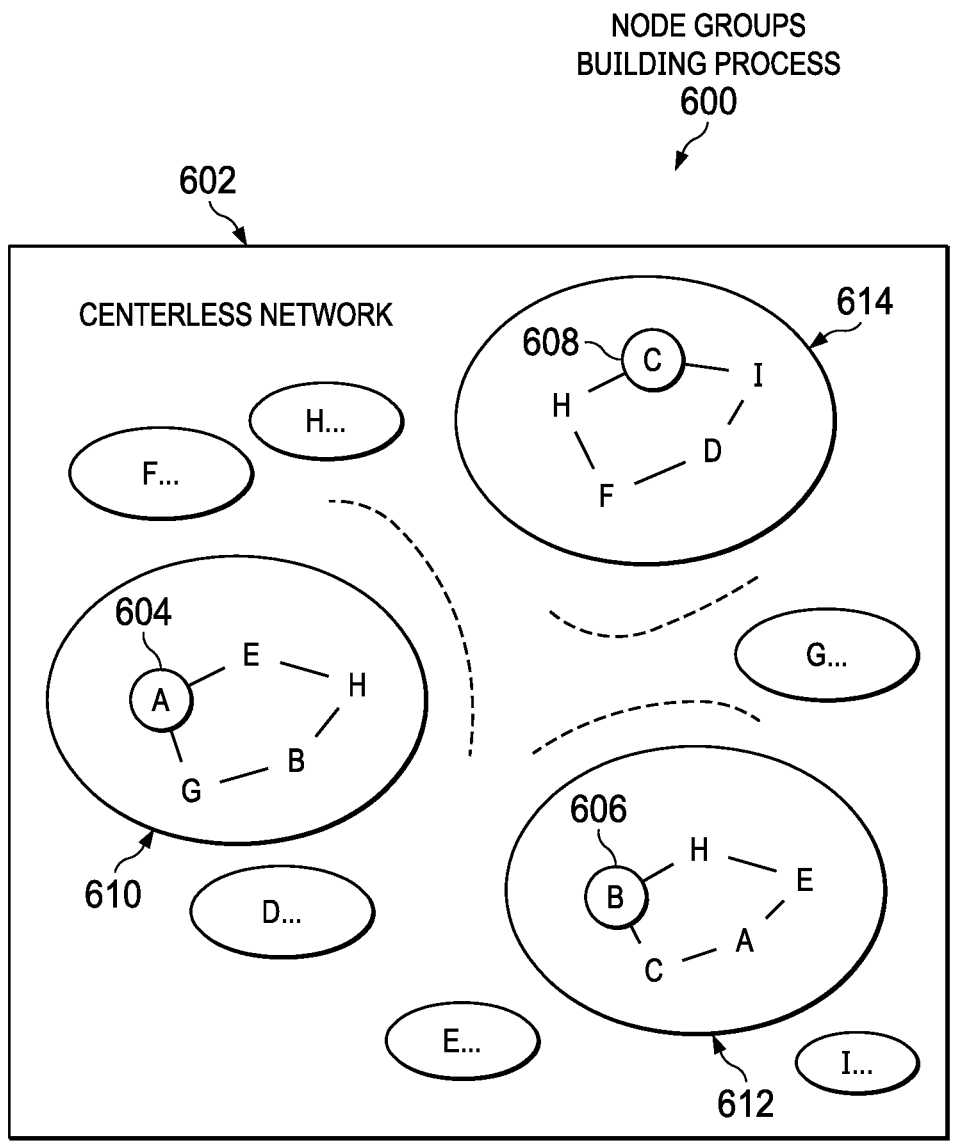
FIG. 6 is a diagram illustrating an example of a node groups building process in accordance with an illustrative embodiment.

With reference now to FIG. 6, a diagram illustrating node groups building process 600 is depicted in accordance with an illustrative embodiment. Illustrative embodiments identify a set of data factors corresponding to database nodes of the cloud platform. In this example, centerless network 602 includes database nodes A, B, C, D, E, F, G, H, and I and the identified set of data factors is table cardinality, page number, access frequency, index level, and others, as shown in the following table.

| Node | Table cardinality | Page number | Access frequency | Index level | Others |
| --- | --- | --- | --- | --- | --- |
| A, B, G | 100~10,000 | 5~15 | 20~100 | P1 | N1 |
| C, E, H | 10,000~1,000,000 | 15~30 | 100~1500 | P2 | N2 |
| D, F, I | 1,000,000 | 30 | 1500 | P3 | N3 |

Based on the table above, illustrative embodiments predict a configuration tuning recommendation. In this example, database nodes A, B, and G, database nodes C, E, and H, and database nodes D, F, and I have similar node-level settings and data factor values. Illustrative embodiments can automatically retrieve all of this information from the cloud platform using a runtime statistics monitoring module that generates these values from a running database.

In this example, database node A 604, database node B 606, and database node C 608 each search their own respective search list for four closest neighbors (i.e., the selected number of neighbors). Thus, each of database node A 604, database node B 606, and database node C 608 has its own set of closest neighbor database node members in its respective virtual group. Each respective virtual group represents closest neighbor database nodes that can communicate with each other within that particular group. For example, database node A 604 has database nodes E, H, B, and G as closest neighbor members of group 610; database node B 606 has database nodes H, E, A, and C as closest neighbor members of group 612; and database node C 608 has database nodes H, F, D, and I as closest neighbor members of group 614. The other database nodes D, E, F, G, H, and I have similar closest neighbor members in their respective virtual groups if they decide to build relationship tables as well.

Figure 7:
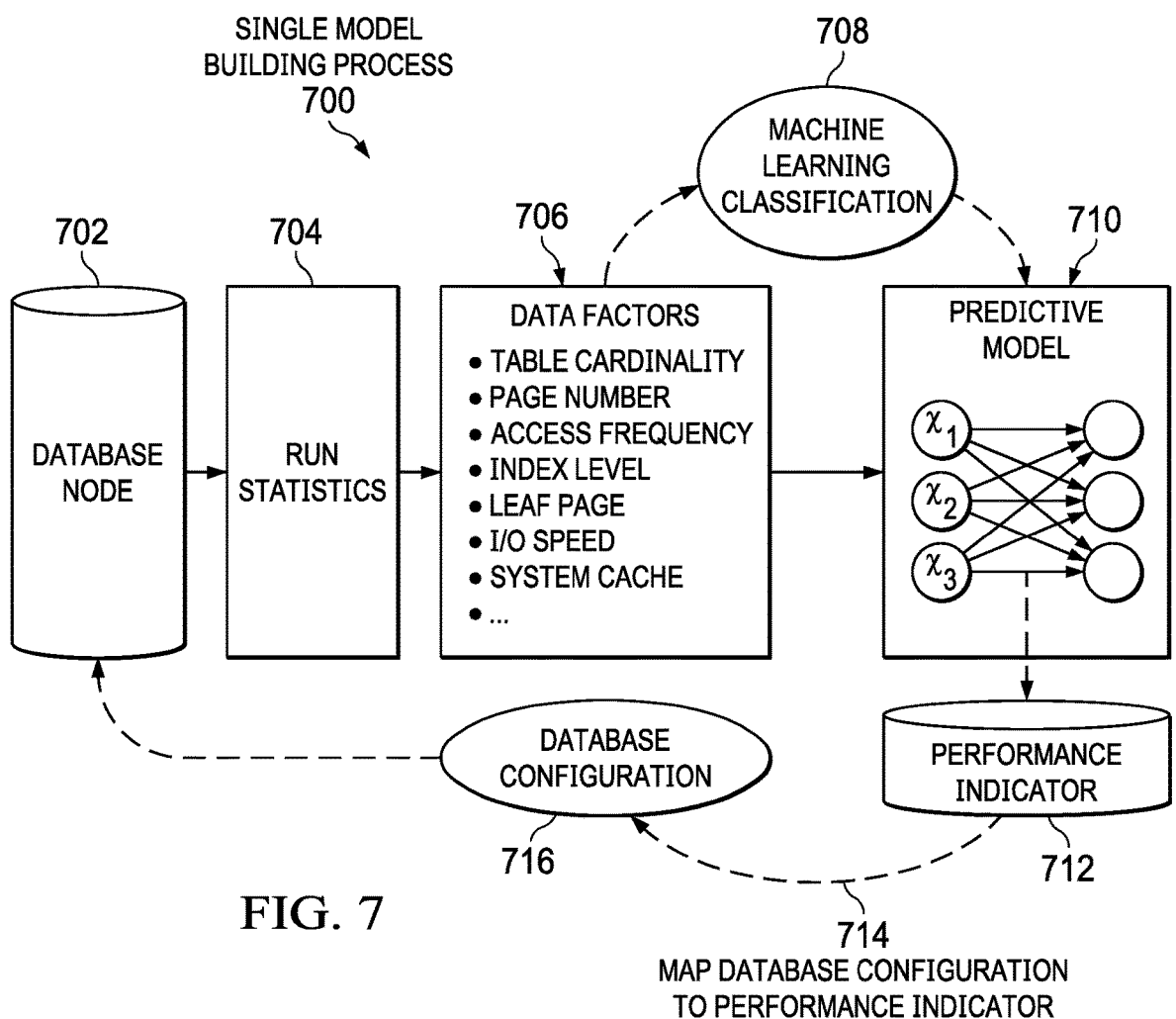
FIG. 7 is a diagram illustrating an example of a single model building process in accordance with an illustrative embodiment.

With reference now to FIG. 7, a diagram illustrating single model building process 700 is depicted in accordance with an illustrative embodiment. In this example, single model building process 700 includes database node 702. At 704, database node 702 runs statistics to find values for data factors 706 corresponding to database node 702. Data factors 706 include table cardinality, page number, access frequency, index level, leaf page, input/output speed, system cache, and the like.

At 708, database node 702 utilizes a machine learning algorithm to classify data factors 706 for predictive model 710. Predictive model 710 is a configuration model corresponding to database node 702. At 712, database node 702 generates a performance indictor corresponding to predictive model 710. At 714, database node 702 maps the database configuration corresponding to predictive model 710 to the performance indicator. At 716, database node 702 determines whether the database configuration is good or bad based on the performance indicator. If the performance indicator is below the defined performance threshold level (i.e., the database configuration is bad), then database node 702 repeats single model building process 700.

Illustrative embodiments collect the values of data factors 706 and build a single configuration model for database node 702 for future use. To collect training data corresponding to data factors 706, illustrative embodiments ask database node 702 to run a statistical analysis on data factors 706 prior to starting the training. To analyze different database performance results, a database trace will indicate whether the current database configuration is reasonable for data factors 706. No matter whether the database configuration is good or bad (i.e., above or below the defined performance threshold level), the database trace discovers all behaviors for reporting to a performance feedback component of the database configuration model. In other words, illustrative embodiments evaluate the configuration model of a single database node by analyzing the performance indicator in the database trace of that particular database node. Illustrative embodiments utilize the following equation to obtain a performance label for a particular database node:

Performance Label=$\Sigma(tc,pn,af,il,lp,io,sc,n_1,n_2 \ldots n_m)\cdot(a_1,a_2,a_3,a_5, \ldots ,a_n)$, where $(tc,pn,af,il,lp,io,sc,n_1,n_2 \ldots n_m)$ are abbreviations for the identified data factors (i.e., table cardinality, page number, access frequency, index level, leaf page, input/output speed, system cache, and other factors, respectively), $(a_1, a_2, a_3, a_4, \ldots , a_n)$ are the corresponding coefficients for the configuration model, and the "Performance Label" is the current database performance indicator for the specified database configuration.

To recommend a database configuration, illustrative embodiments record the mapping between the database configuration data factor values and the real-time database performance indicator (i.e., the performance label). In other words, illustrative embodiments map each performance indicator to a set of database configurations. For example, $(B_1, B_2, B_3, B_4, \ldots B_n)$ represents a set of database configuration recommendations or options. Thus, illustrative embodiments refine the equation above as follows:

$$\{(B_1,B_2,B_3,B_4,\ldots,B_n)|PL\}=\Sigma(tc,pn,af,il,lp,io,sc,n_1,n_2\ldots n_m)\cdot(a_1,a_2,a_3,a_4,\ldots,a_n),$$

where PL is the abbreviation for the performance label. In this calculation, illustrative embodiments leverage the classification algorithm of supervised machine learning to classify the performance label with the identified data factors. Illustrative embodiments may utilize, for example, logistic regression, support-vector machine, or ensemble learning to train the configuration model corresponding to the database node. The target is to train the coefficients (i.e., $a_1$, $a_2$, $a_3$, $a_4$, ..., $a_n$) for the configuration model, which expects the database trace not to have performance indicators below the defined performance threshold level any more. This training is the single training for the database node.

The configuration model of a database node depends on many data factors. In other words, there are different data factors for different database nodes. To avoid database configuration model overfit, illustrative embodiments train the different database configuration models incrementally in different database nodes for future use. Because illustrative embodiments utilize the same training algorithm, illustrative embodiments modify the equation above as follows:

$$\{(B_1, B_2, B_3, B_4 \ldots B_n)_i \mid PL_i\} = \sum_{i=0}^{site\ N} (tc, pn, af, il, lp, io, sc, n_1, n_2 \ldots n_m)_i \cdot (a_1, a_2, a_3, a_4 \ldots a_n)_i,$$

where the symbol i represents the database node.

Figure 8:
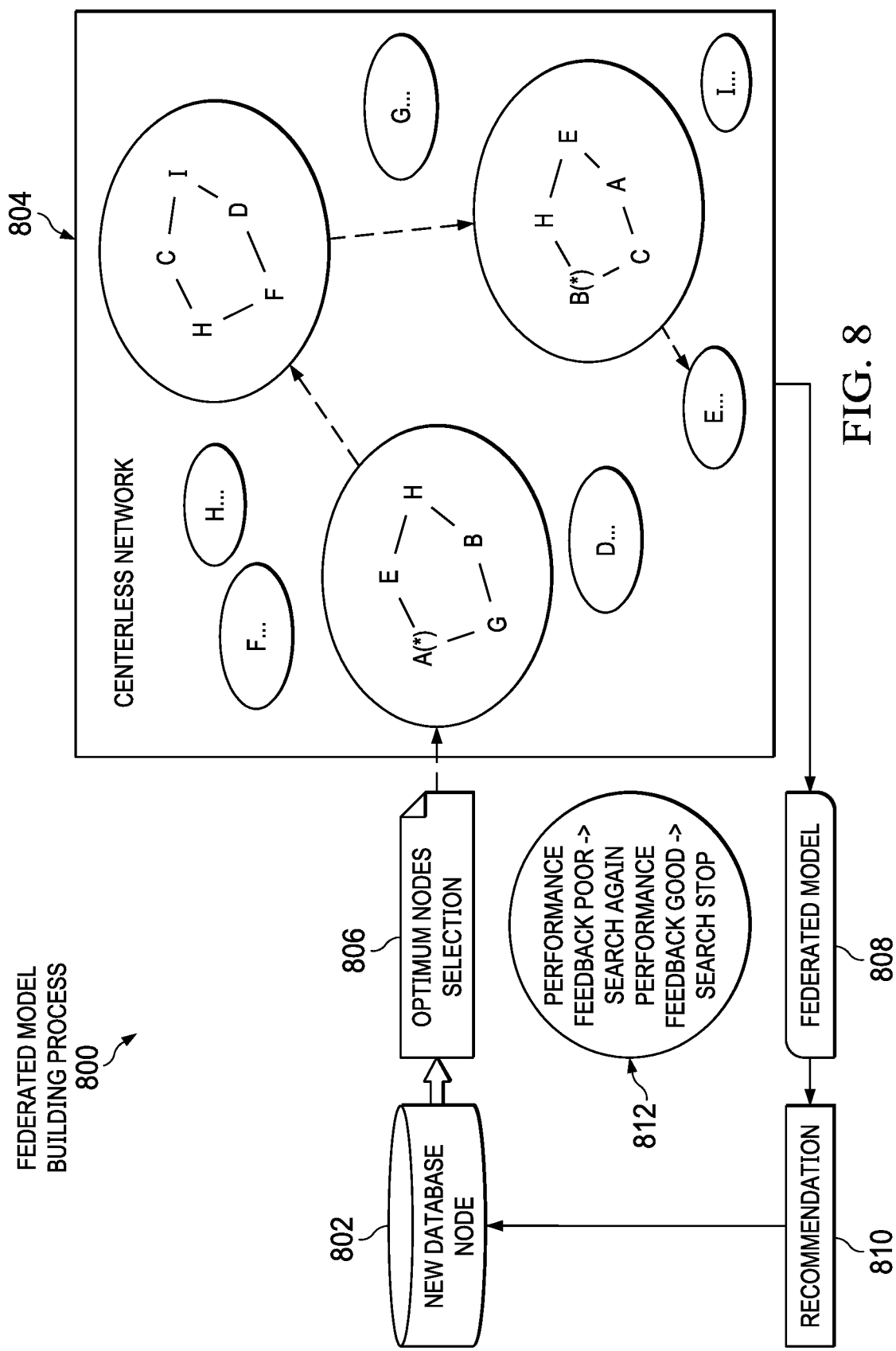
FIG. 8 is a diagram illustrating an example of a federated model building process in accordance with an illustrative embodiment.

With reference now to FIG. 8, a diagram illustrating federated model building process 800 is depicted in accordance with an illustrative embodiment. Federated model building process 800 includes new database node 802, which is to be added to the cloud platform, and centerless network 804. At 806, new database node 802 selects an optimal dynamic group of closest neighbor database nodes within centerless network 804 and then builds federated database configuration model 808 based on the database configuration models corresponding to each of the respective database nodes in the group. Once new database node 802 selects a set of closest neighbor database nodes, illustrative embodiments leverage the database configuration models corresponding to the selected set of closest neighbor database nodes for calculating database configuration recommendation 810 for new database node 802.

Thus, as a first step, new database node 802 selects the optimal set of closest neighbor database nodes based on vector relationship values in the relationship table of new database node 802. In other words, illustrative embodiments use the vector relationship equation above to calculate the vector relationship between the new database node and existing database nodes in the cloud platform. The new database node searches a subset of the database nodes listed in its relationship table. It should be noted that performance will improve when the search is based on the current relationship table. Because the database nodes listed in the relationship table have closer relationships, these database nodes will have more common data factors with the new database node.

However, the new database node will not stay in just one relationship table, but may go through any number of relationship tables corresponding to other database nodes when the new database node determines that the search needs to be continued for a better database configuration recommendation. As a result, this is an iterative process. For example, the running database node provides performance feedback to determine whether the search needs to be restarted. Illustrative embodiments utilize the following equation:

$$Set_{new} = \bigcup_{\substack{i=(0.1\ldots M),\\j=(0.1\ldots N)}}^{M,N} r(\overrightarrow{new}, \overrightarrow{D_{i,j}}).$$

where $Set_{new}$ represents the optimal set of neighbor database nodes for the new database node and $\overrightarrow{D}_{i,j}$ represents the $j_{th}$ node's relationship vector in the $i_{th}$ node's relationship table. Illustrative embodiments utilize the equation above to select the optimal set of neighbor database nodes, which are closest to the new database node, for providing optimal database configuration recommendations for the new database node.

Illustrative embodiments build the federated database configuration model based on the database configuration models corresponding to the selected optimal set of closest neighbor database nodes. In other words, illustrative embodiments only utilize the database configuration models of the selected optimal set of closest neighbor database nodes to build the federated database configuration model for the new database node's configuration recommendation. This means that the federated model building process only happens in the selected optimal set of closest neighbor database nodes when the new database node trusts those database nodes. Not only does this mean that the new database node will get a reasonable configuration recommendation, but the other database nodes in the selected optimal set do not need to start calculations to improve predictive performance. Thus, federated database configuration model 808 is the synthesis of all database node members in the selected optimal set of closest neighbor database nodes. Illustrative embodiments regard federated database configuration model 808 as the optimal model for database configuration recommendation 810 for new database node 802.

New database node 802 searches the closest neighbors as optimum candidates for its database configuration recommendation. New database node 802 may search the neighbors' relationship tables to find closer database nodes. In this example, new database node 802 searches the relationship tables of database nodes A, C, B, and E. Based on information in the searched relationship tables, database nodes E, H, and I are closest neighbors to new database node 802. As a result, illustrative embodiments will include database nodes E, H, and I in the selected optimal set of closest neighbor database nodes. Further, database nodes A and B, which are marked with an "*", are also closest neighbors to new database node 802 based on the information in the searched relationship tables. Consequently, illustrative embodiments include database nodes A and B in the selected optimal set of closest neighbor database nodes as well.

Illustrative embodiments utilize federated database configuration model 808, which is based on the configuration models of the selected optimal set of closest neighbor database nodes, to predict a reasonable configuration for new database node 802. If, at 812, the performance indicator for new database node 802 is below the defined performance threshold level after applying recommendation 810 from the selected optimal set of closest neighbor database nodes, then illustrative embodiments will restart the search. Otherwise, illustrative embodiments stop the search because recommendation 810 is good enough for the current tuning of new database node 802.

Figure 9:
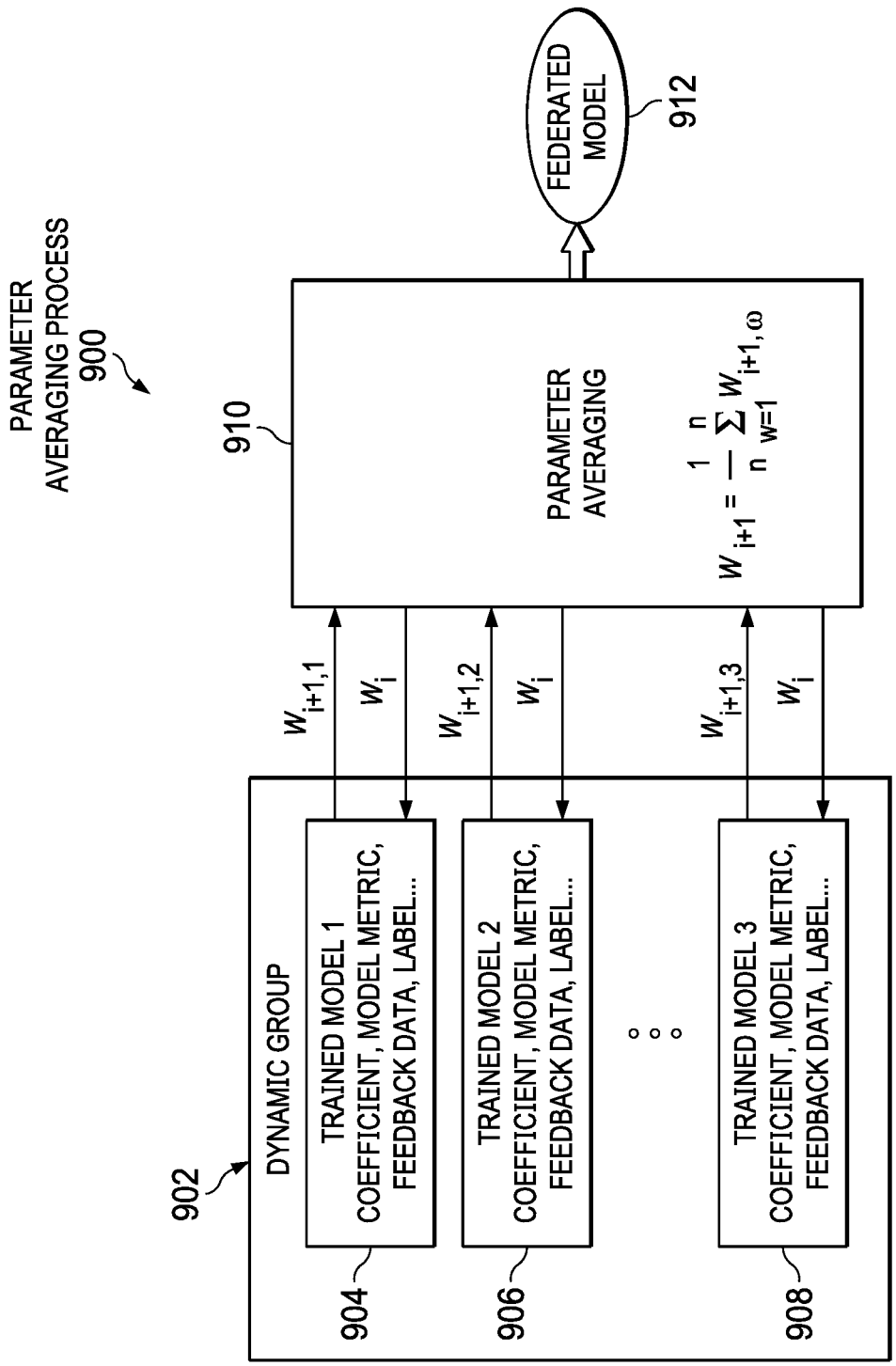
FIG. 9 is a diagram illustrating an example of a parameter averaging process in accordance with an illustrative embodiment.

With reference now to FIG. 9, a diagram illustrating parameter averaging process 900 is depicted in accordance with an illustrative embodiment. In this example, parameter averaging process 900 includes dynamic group 902. Dynamic group 902 represents a virtual group of database nodes in the centerless network. In this example, dynamic group 902 of database nodes includes trained model 1 904, trained model 2 906, and trained model 3 908. Trained model 1 904, trained model 2 906, and trained model 3 908 represent trained database configuration models corresponding to each of the respective database nodes in dynamic group 902.

It should be noted that illustrative embodiments use the same machine learning algorithm to train the database configuration models for the entire database system of the cloud platform. As a result, illustrative embodiments can federate these database configuration models using parameter averaging 910. Parameter averaging 910 may represent any type of configuration model parameter averaging method. The configuration model parameters may be, for example, configuration model coefficients, configuration model values, configuration model performance feedback data, and configuration model performance labels. Illustrative embodiments may also leverage other methods to federate sub-parameters. However, this depends on the cost of parameter synchronization and network communication. Illustrative embodiments may utilize any parameter synchronization method for data parallelism in this federation step. In this example, illustrative embodiments use the parameter averaging method.

Illustrative embodiments perform parameter averaging 910 using the following equation:

$$W_{i+1} = \frac{1}{n}\sum_{w=1}^{n} W_{i+1,w} = \frac{1}{n}\sum_{w=1}^{n}\left(W_i - \frac{\alpha}{m}\sum_{j=(w-1)m+1}^{wm} \frac{\partial L^j}{\partial W_i}\right) = W_i - \frac{\alpha}{nm}\sum_{j=1}^{nm} \frac{\partial L^j}{\partial W_i}.$$

Illustrative embodiments assume that the sample data is distributed to "n" number of database nodes and every database node learns from "m" sample data. For example, the first database node handles sample data (1, 2, . . . m), the second database node handles the next m sample data (m+1, m+2, . . . 2m). As a result, federated configuration model 912 includes different data factors from members of the selected optimal set of closest neighbor database nodes (i.e., dynamic group 902). In addition, the different database nodes in this selected optimal set do not need to know any confidential information, such as, for example, database statistics, sensitive data, or any other data the database node users do not want to share, which corresponds to any other database nodes in the set.

Figure 10:
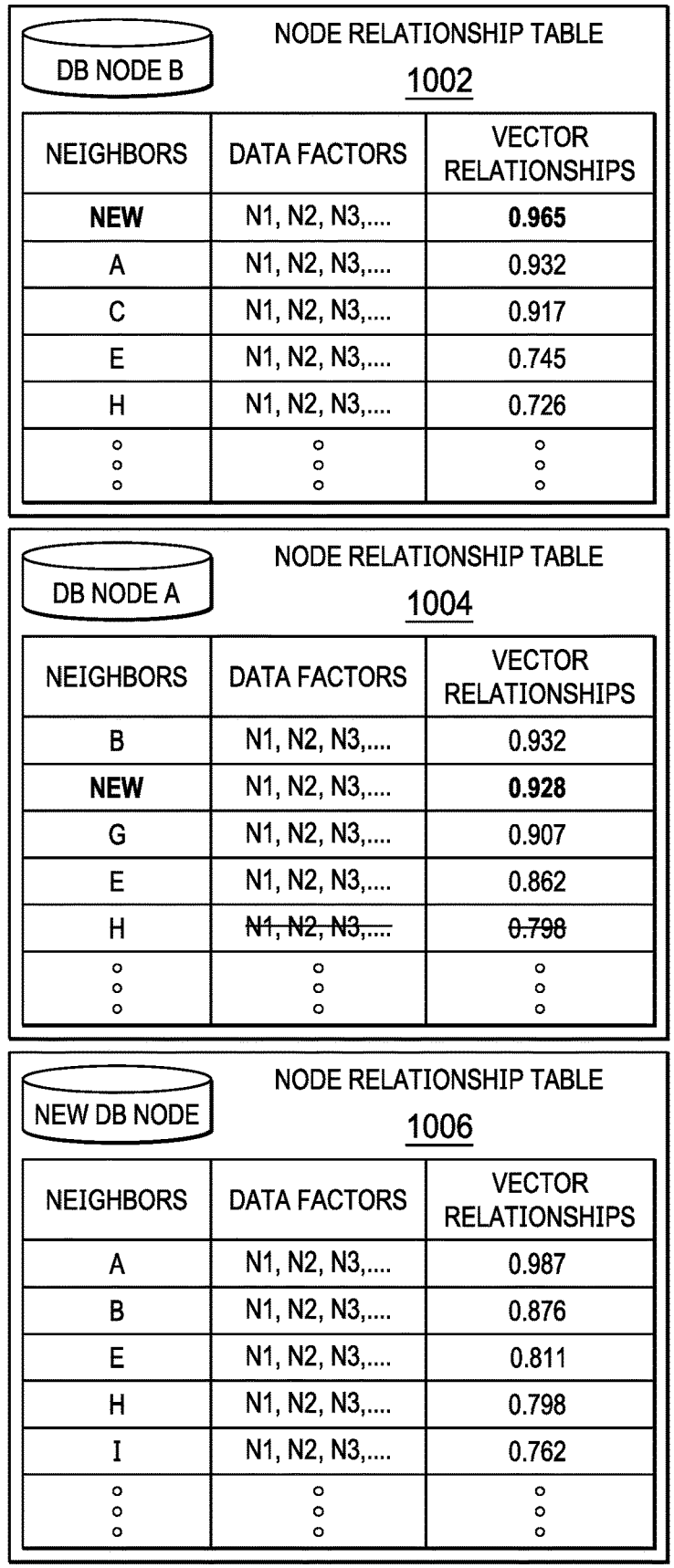
FIG. 10 is a diagram illustrating an example of a new node adding process in accordance with an illustrative embodiment.

With reference now to FIG. 10, a diagram illustrating new node adding process 1000 is depicted in accordance with an illustrative embodiment. In this example, new node adding process 1000 includes node relationship table 1002, node relationship table 1004, and node relationship table 1006. Node relationship table 1002 corresponds to database node B, node relationship table 1004 corresponds to database node A, and node relationship table 1006 corresponds to the new database node.

Illustrative embodiments add the new database node into the self-organized, centerless network for optimization iteration. After the new database node applies the configuration recommendation, illustrative embodiments place the new database node in the centerless network as a new training data contributor for network optimization. The new database node helps to enhance the centerless network by making the centerless network flexible enough for a range of abilities. The self-organized, centerless network will adjust itself in the following situation. The selected optimal set of closest neighbor database nodes, such as the virtual group corresponding to database node B(*) in FIG. 8, has the new database node added as a new member. In relationship table 1002 for database node B, illustrative embodiments calculate the new database node's vector relationship to database node B and list the vector relationship ("0.965") in relationship table 1002.

Some other database nodes, such as database node A, also add the new database node to their relationship tables, but may also drop some other database nodes after recalculating the vector relationships across database nodes because the dropped nodes are not close to the respective database nodes anymore. In this example, illustrative embodiments add the new database node to relationship table 1004 of database node A, but remove database node H from relationship table 1004 at the same time.

Still some other database nodes, such as database node C, do not add the new database node to their respective relationship tables because the new database node does not have a close enough vector relationship (i.e., above the dynamic relationship value threshold) for these other database nodes. The new database node will then start to manage a new virtual group of database nodes based on itself with other neighbor database nodes as if the new database node was a part of the training data input from the beginning.

Figure 11:
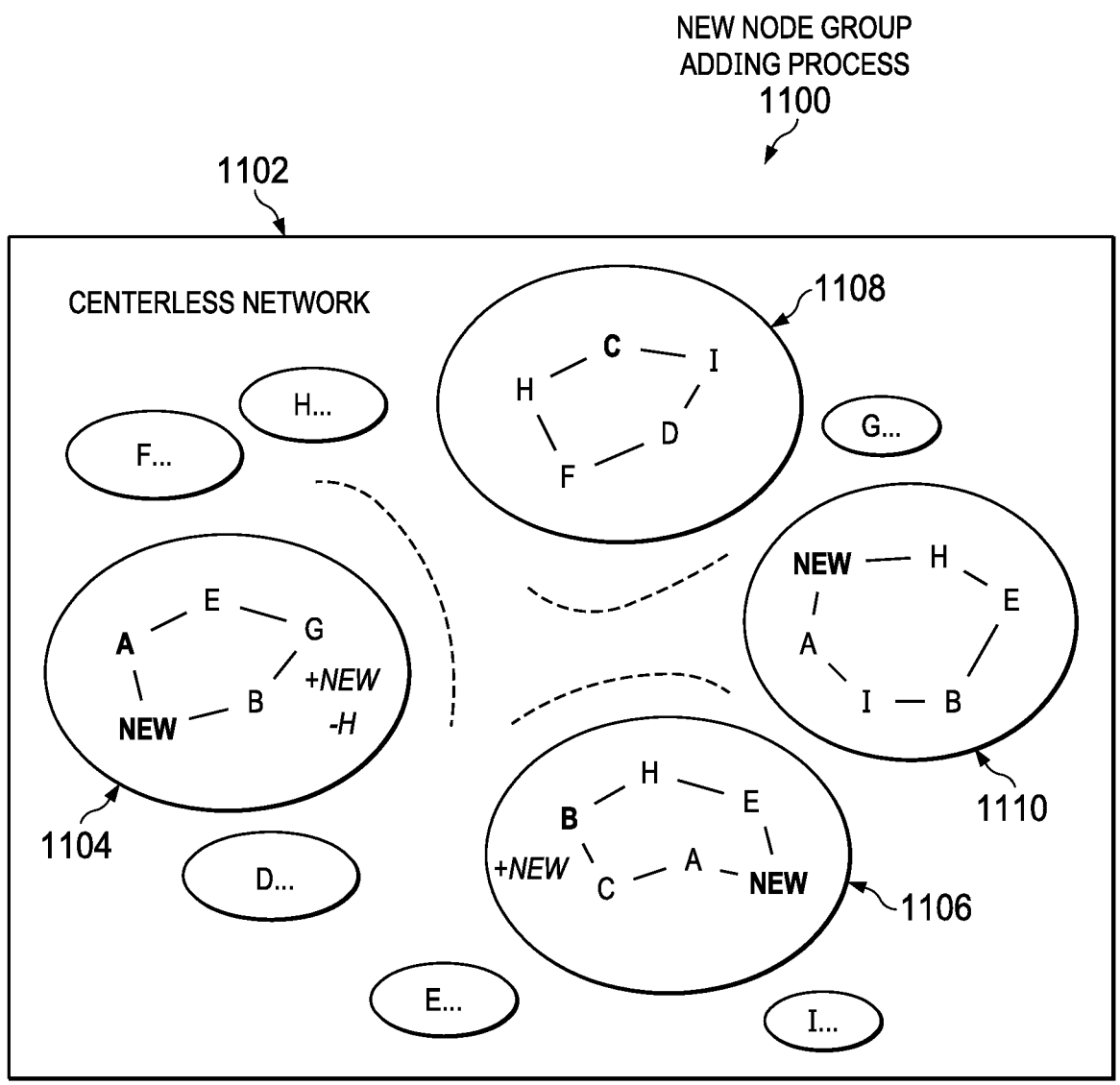
FIG. 11 is a diagram illustrating an example of a new node group adding process in accordance with an illustrative embodiment.

With reference now to FIG. 11, a diagram illustrating new node group adding process 1100 is depicted in accordance with an illustrative embodiment. In this example, new node group adding process 1100 includes centerless network 1102. Centerless network 1102 includes virtual group 1104, virtual group 1106, virtual group 1108, virtual group 1110, as well as other virtual groups. Virtual group 1104, which corresponds to database node A, adds the new database node and removes database node H. Virtual group 1106, which corresponds to database node B, also adds the new database node. However, virtual group 1108, which corresponds to database node C, does not add the new database node. Virtual group 1110 corresponds to the new database node.

Consequently, illustrative embodiments repeat the process of building new node relationship tables for the database nodes in a second round of calculations. FIG. 11 illustrates the second-round centerless network output. After illustrative embodiments build centerless network 1102 with the new database node, centerless network 1102 now contains the data factors corresponding to the new database node as supplemental training data. As a result, illustrative embodiments can now predict different database configuration tunings based on the new supplemental training data input by the new database node added to centerless network 1102.

Figure 12:
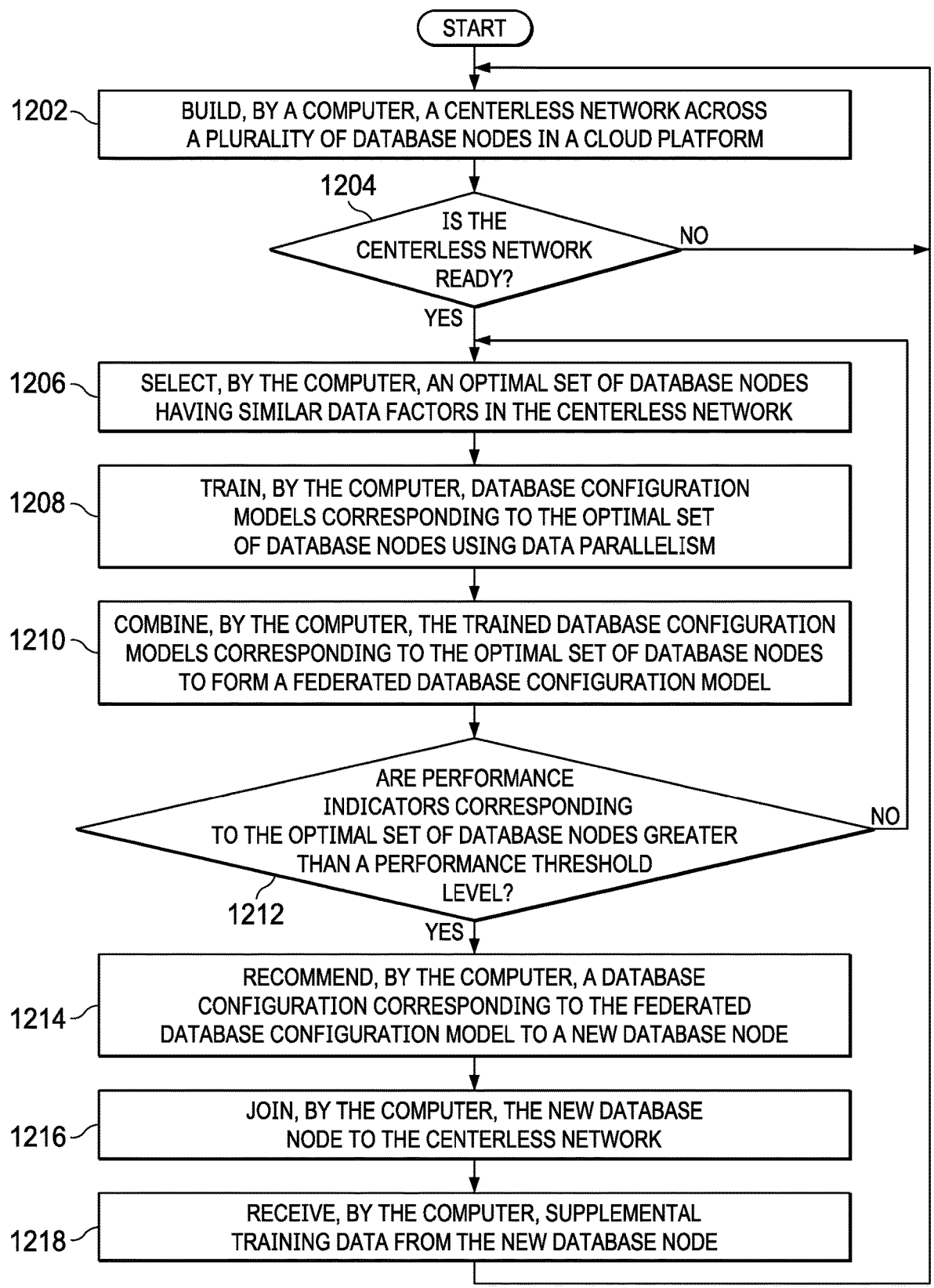
FIG. 12 is a flowchart illustrating a process for joining a new database node to a centerless network in accordance with an illustrative embodiment.

With reference now to FIG. 12, a flowchart illustrating a process for joining a new database node to a centerless network is shown in accordance with an illustrative embodiment. The process shown in FIG. 12 may be implemented in a computer, such as, for example, server 104 in FIG. 1, data processing system 200 in FIG. 2, or a cloud computing node in cloud computing nodes 310 in FIG. 3.

The process begins when the computer builds a centerless network across a plurality of database nodes in a cloud platform (step 1202). The computer makes a determination as to whether the centerless network is ready (step 1204). If the computer determines that the centerless network is not ready, no output of step 1204, then the process returns to step 1202 where the computer continues to build the centerless network. If the computer determines that the centerless network is ready, yes output of step 1204, then the computer selects an optimal set of database nodes having similar data factors in the centerless network (step 1206).

The computer trains database configuration models corresponding to the optimal set of database nodes using data parallelism (step 1208). The computer combines the trained database configuration models corresponding to the optimal set of database nodes to form a federated database configuration model (step 1210). The computer makes a determination as to whether performance indicators corresponding to the optimal set of database nodes are greater than a performance threshold level (step 1212). The performance threshold level is a minimum performance threshold level.

If the computer determines that the performance indicators corresponding to the optimal set of database nodes are less than the performance threshold level, no output of step 1212, then the process returns to step 1206 where the computer selects another optimal set of database nodes. If the computer determines that the performance indicators corresponding to the optimal set of database nodes are greater than the performance threshold level, yes output of step 1212, then the computer recommends a database configuration corresponding to the federated database configuration model to a new database node (step 1214).

The computer joins the new database node to the centerless network (step 1216). The computer receives supplemental training data from the new database node (step 1218). Thereafter, the process returns to step 1202 where the computer reorganizes the centerless network based on the new database node joining the centerless network.

Figure 13:
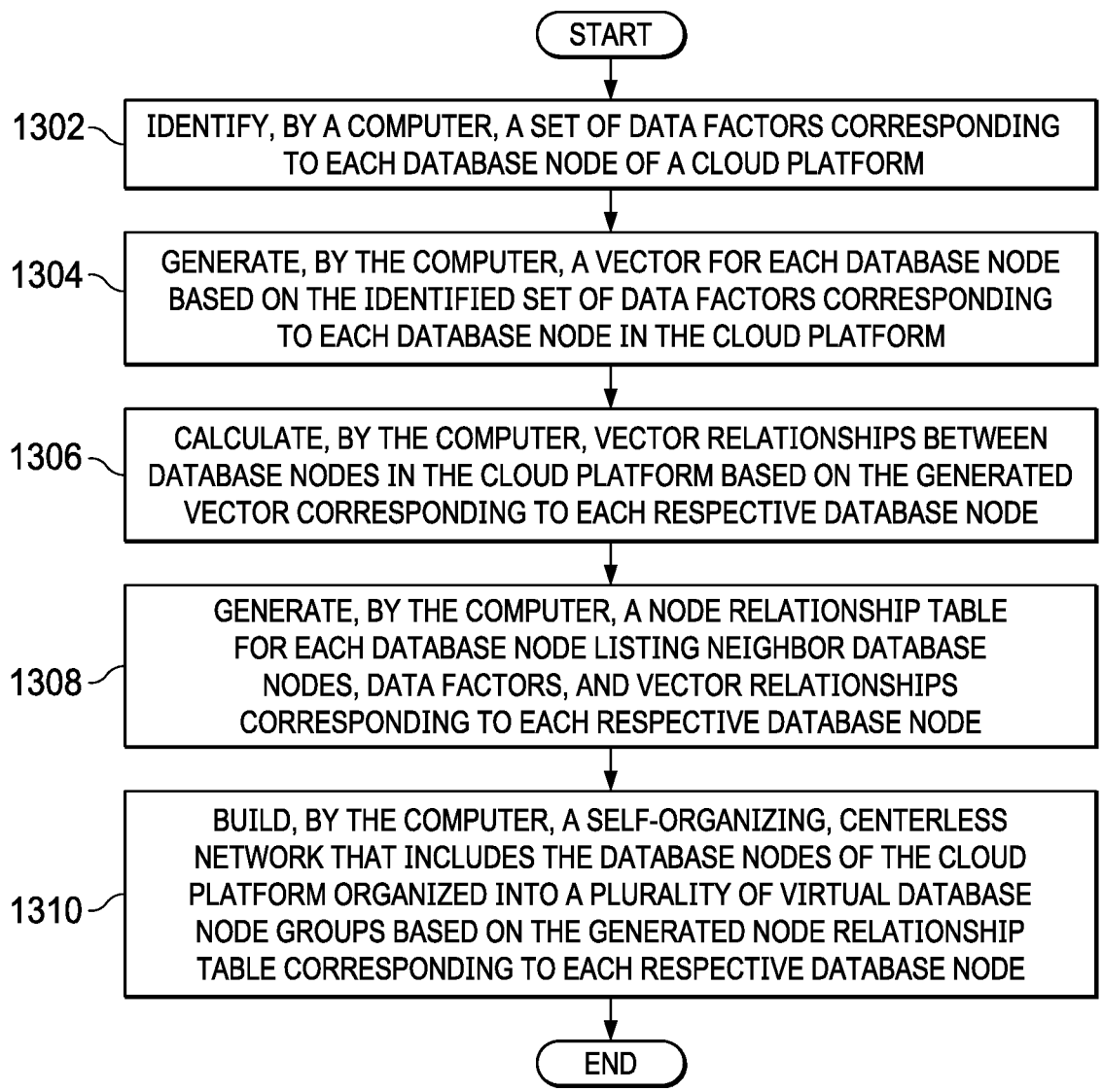
FIG. 13 is a flowchart illustrating a process for building a centerless network in accordance with an illustrative embodiment.

With reference now to FIG. 13, a flowchart illustrating a process for building a centerless network is shown in accordance with an illustrative embodiment. The process shown in FIG. 13 may be implemented in a computer, such as, for example, server 104 in FIG. 1, data processing system 200 in FIG. 2, or a cloud computing node in cloud computing nodes 310 in FIG. 3.

The process begins when the computer identifies a set of data factors corresponding to each database node of a cloud platform (step 1302). The computer generates a vector for each database node based on the identified set of data factors corresponding to each database node in the cloud platform (step 1304). The computer calculates vector relationships between database nodes in the cloud platform based on the generated vector corresponding to each respective database node (step 1306).

The computer generates a node relationship table for each database node listing neighbor database nodes, data factors, and vector relationships corresponding to each respective database node (step 1308). The computer builds a self-organizing, centerless network that includes the database nodes of the cloud platform organized into a plurality of virtual database node groups based on the generated node relationship table corresponding to each respective database node (step 1310). Thus, the computer dynamically builds the centerless network in real time providing increased performance to each database node group. Thereafter, the process terminates.

Figure 14:
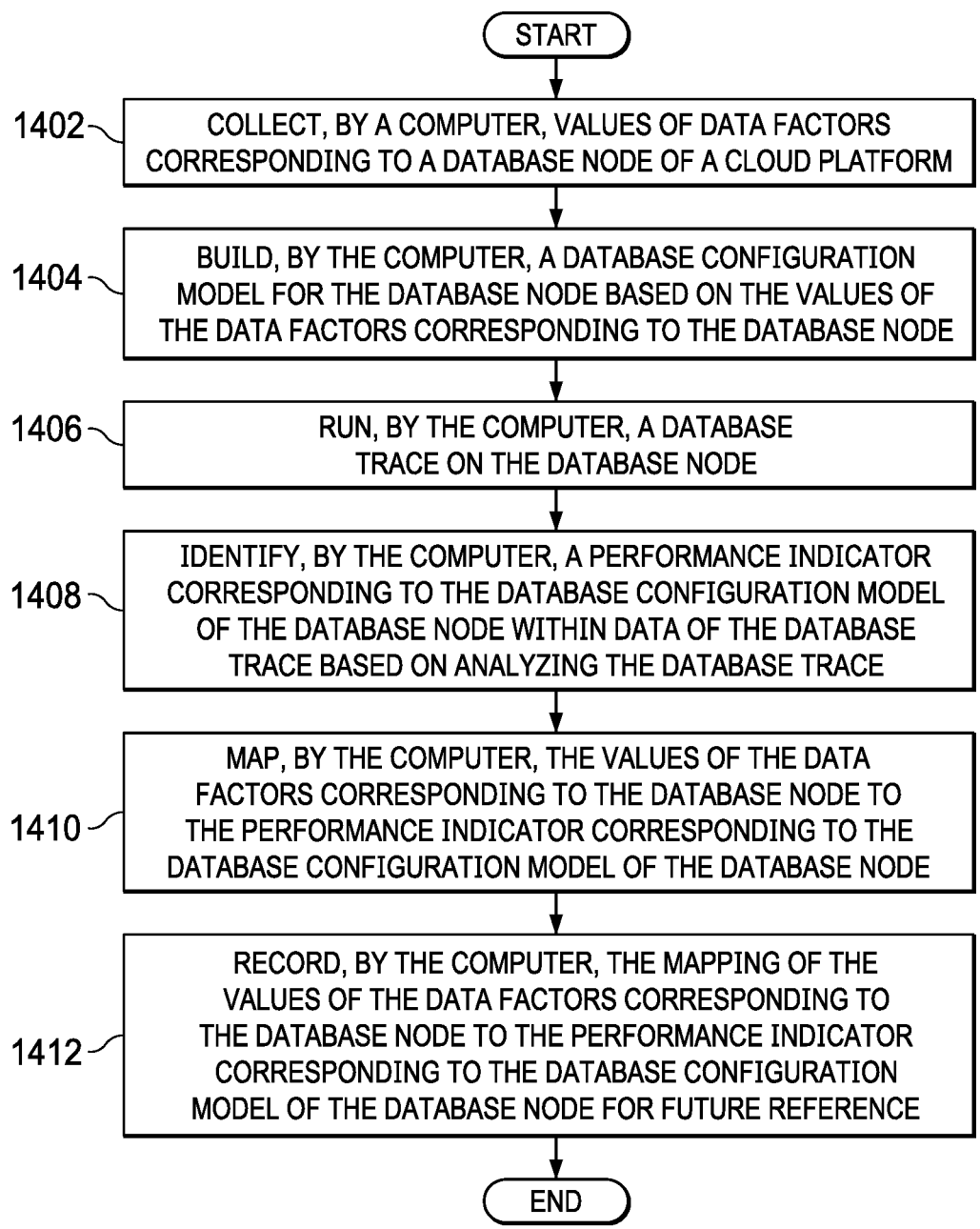
FIG. 14 is a flowchart illustrating a process for mapping a performance indicator to a database configuration in accordance with an illustrative embodiment.

With reference now to FIG. 14, a flowchart illustrating a process for mapping a performance indicator to a database configuration is shown in accordance with an illustrative embodiment. The process shown in FIG. 14 may be implemented in a computer, such as, for example, server 104 in FIG. 1, data processing system 200 in FIG. 2, or a cloud computing node in cloud computing nodes 310 in FIG. 3.

The process begins when the computer collects values of data factors corresponding to a database node of a cloud platform (step 1402). The computer builds a database configuration model for the database node based on the values of the data factors corresponding to the database node (step 1404). The computer runs a database trace on the database node (step 1406).

The computer identifies a performance indicator corresponding to the database configuration model of the database node within data of the database trace based on analyzing the database trace (step 1408). The computer maps the values of the data factors corresponding to the database node to the performance indicator corresponding to the database configuration model of the database node (step 1410). The computer records the mapping of the values of the data factors corresponding to the database node to the performance indicator corresponding to the database configuration model of the database node for future reference (step 1412). Thereafter, the process terminates.

Figure 15:
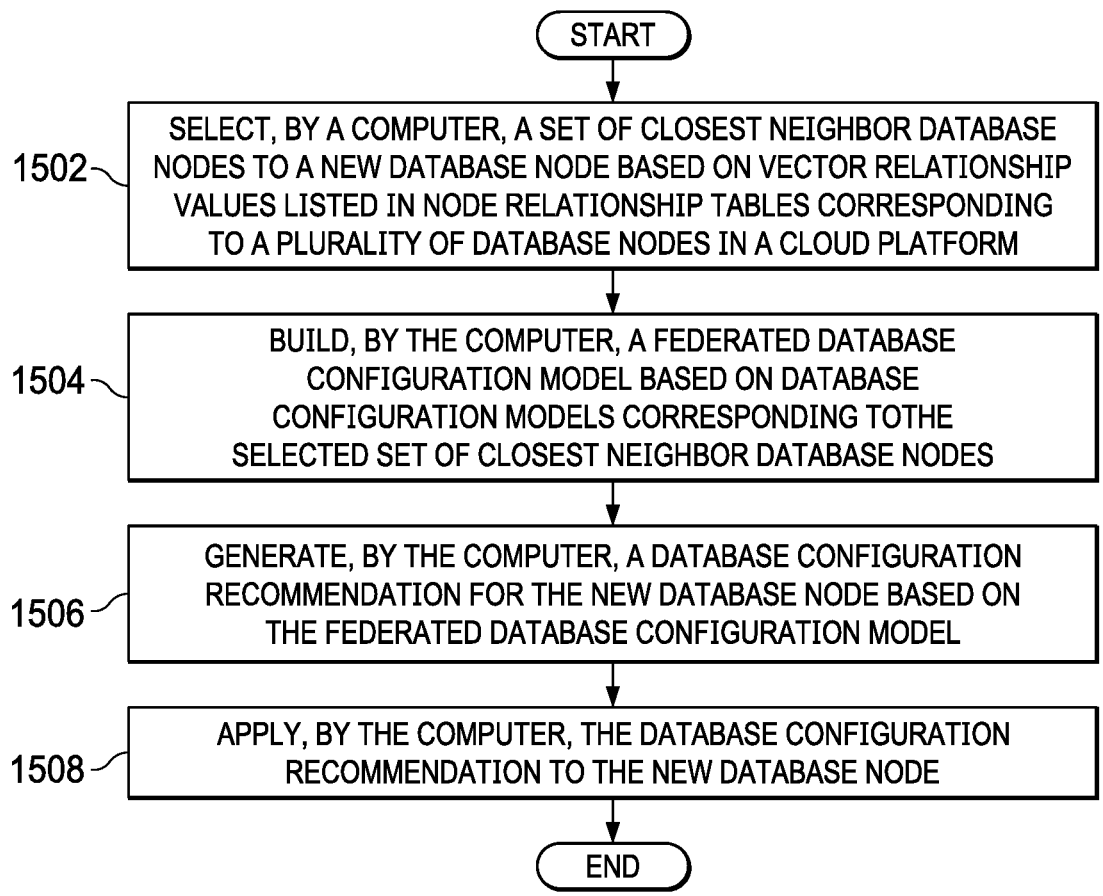
FIG. 15 is a flowchart illustrating a process for generating a database configuration recommendation for a new database node in accordance with an illustrative embodiment.

With reference now to FIG. 15, a flowchart illustrating a process for generating a database configuration recommendation for a new database node is shown in accordance with an illustrative embodiment. The process shown in FIG. 15 may be implemented in a computer, such as, for example, server 104 in FIG. 1, data processing system 200 in FIG. 2, or a cloud computing node in cloud computing nodes 310 in FIG. 3.

The process begins when the computer selects a set of closest neighbor database nodes to a new database node based on vector relationship values listed in node relationship tables corresponding to a plurality of database nodes in a cloud platform (step 1502). The computer builds a federated database configuration model based on database configuration models corresponding to the selected set of closest neighbor database nodes (step 1504). The computer generates a database configuration recommendation for the new database node based on the federated database configuration model (step 1506). The computer applies the database configuration recommendation to the new database node (step 1508). Thereafter, the process terminates.

Thus, illustrative embodiments of the present invention provide a computer-implemented method, computer system, and computer program product for tuning a configuration of a database node using a federated machine learning system of a self-organized, centerless network of a plurality of database nodes. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for database configuration tuning, the computer-implemented method comprising:
   selecting, by a computer, a set of database nodes having similar data factors in a centerless network of database nodes;
   training, by the computer, configuration models corresponding to the set of database nodes using data parallelism;
   combining, by the computer, trained configuration models corresponding to the set of database nodes to form a federated configuration model;
   determining, by the computer, whether performance indicators corresponding to the set of database nodes are greater than a performance threshold level;
   responsive to the computer determining that the performance indicators corresponding to the set of database nodes are greater than the performance threshold level, recommending, by the computer, a database configuration corresponding to the federated configuration model to a new database node; and
   joining, by the computer, the new database node to the centerless network.

2. The computer-implemented method of claim 1 further comprising:
   identifying, by the computer, a set of data factors corresponding to each database node in the centerless network of database nodes; and
   generating, by the computer, a vector for each database node based on the set of data factors corresponding to each database node.

3. The computer-implemented method of claim 2 further comprising:
   calculating, by the computer, vector relationships between the database nodes in the centerless network based on the generated vector corresponding to each respective database node; and
   generating, by the computer, a node relationship table for each database node in the centerless network listing neighbor database nodes, data factors, and vector relationships corresponding to each respective database node.

4. The computer-implemented method of claim 3 further comprising:
   building, by the computer, the centerless network that includes the database nodes organized into a plurality of virtual database node groups, each virtual database node group based on the generated node relationship table corresponding to each respective database node.

5. The computer-implemented method of claim 1 further comprising:
   collecting, by the computer, values of data factors corresponding to a database node in the centerless network of database nodes; and
   building, by the computer, a configuration model for the database node based on the values of the data factors corresponding to the database node.

6. The computer-implemented method of claim 5, wherein the data factors include table cardinality, page number, access frequency, index level, leaf page, input/output speed, and system cache.

7. The computer-implemented method of claim 5 further comprising:
   running, by the computer, a database trace on the database node in the centerless network of database nodes; and
   identifying, by the computer, a performance indicator corresponding to the configuration model of the database node within data of the database trace.

8. The computer-implemented method of claim 7 further comprising:
   mapping, by the computer, the values of the data factors corresponding to the database node to the performance indicator corresponding to the configuration model of the database node; and
   recording, by the computer, the mapping of the values of the data factors corresponding to the database node to the performance indicator corresponding to the configuration model of the database node for future reference.

9. The computer-implemented method of claim 1 further comprising:
   selecting, by the computer, a set of closest neighbor database nodes to the new database node based on vector relationship values listed in node relationship tables corresponding to the database nodes in the centerless network; and
   building, by the computer, the federated configuration model based on configuration models corresponding to the set of closest neighbor database nodes to the new database node.

10. The computer-implemented method of claim 1 further comprising:
    generating, by the computer, a database configuration recommendation for the new database node based on the federated configuration model; and
    applying, by the computer, the database configuration recommendation to the new database node.

11. The computer-implemented method of claim 1, wherein the computer uses averaging of configuration model parameters to combine the trained configuration models corresponding to the set of database nodes to generate the federated configuration model.

12. The computer-implemented method of claim 11, wherein the configuration model parameters include configuration model coefficients, configuration model values, configuration model performance feedback data, and configuration model performance labels.

13. The computer-implemented method of claim 1, wherein the centerless network of database nodes is located in a cloud environment.

14. A computer system for database configuration tuning, the computer system comprising:
    a bus system;
    a storage device connected to the bus system, wherein the storage device stores program instructions; and
    a processor connected to the bus system, wherein the processor executes the program instructions to:
      select a set of database nodes having similar data factors in a centerless network of database nodes;
      train configuration models corresponding to the set of database nodes using data parallelism;
      combine trained configuration models corresponding to the set of database nodes to form a federated configuration model;
      determine whether performance indicators corresponding to the set of database nodes are greater than a performance threshold level;
      recommend a database configuration corresponding to the federated configuration model to a new database node in response to determining that the performance indicators corresponding to the set of database nodes are greater than the performance threshold level; and join the new database node to the centerless network.

15. The computer system of claim 14, wherein the processor further executes the program instructions to:

identify a set of data factors corresponding to each database node in the centerless network of database nodes; and generate a vector for each database node based on the set of data factors corresponding to each database node.

16. The computer system of claim 15, wherein the processor further executes the program instructions to:

calculate vector relationships between the database nodes in the centerless network based on the generated vector corresponding to each respective database node; and generate a node relationship table for each database node in the centerless network listing neighbor database nodes, data factors, and vector relationships corresponding to each respective database node.

17. The computer system of claim 16, wherein the processor further executes the program instructions to:

build the centerless network that includes the database nodes organized into a plurality of virtual database node groups, each virtual database node group based on the generated node relationship table corresponding to each respective database node.

18. A computer program product for database configuration tuning, the computer program product comprising a computer readable storage medium having program instructions embodied therewith, the program instructions executable by a computer to cause the computer to perform a method comprising:

selecting, by the computer, a set of database nodes having similar data factors in a centerless network of database nodes;

training, by the computer, configuration models corresponding to the set of database nodes using data parallelism;

combining, by the computer, trained configuration models corresponding to the set of database nodes to form a federated configuration model;

determining, by the computer, whether performance indicators corresponding to the set of database nodes are greater than a performance threshold level;

responsive to the computer determining that the performance indicators corresponding to the set of database nodes are greater than the performance threshold level, recommending, by the computer, a database configuration corresponding to the federated configuration model to a new database node; and joining, by the computer, the new database node to the centerless network.

19. The computer program product of claim 18 further comprising:

identifying, by the computer, a set of data factors corresponding to each database node in the centerless network of database nodes; and generating, by the computer, a vector for each database node based on the set of data factors corresponding to each database node.

20. The computer program product of claim 19 further comprising:

calculating, by the computer, vector relationships between the database nodes in the centerless network based on the generated vector corresponding to each respective database node; and generating, by the computer, a node relationship table for each database node in the centerless network listing neighbor database nodes, data factors, and vector relationships corresponding to each respective database node.

21. The computer program product of claim 20 further comprising:

building, by the computer, the centerless network that includes the database nodes organized into a plurality of virtual database node groups, each virtual database node group based on the generated node relationship table corresponding to each respective database node.

22. The computer program product of claim 18 further comprising:

collecting, by the computer, values of data factors corresponding to a database node in the centerless network of database nodes; and building, by the computer, a configuration model for the database node based on the values of the data factors corresponding to the database node.

23. The computer program product of claim 22, wherein the data factors include table cardinality, page number, access frequency, index level, leaf page, input/output speed, and system cache.

24. The computer program product of claim 22 further comprising:

running, by the computer, a database trace on the database node in the centerless network of database nodes; and identifying, by the computer, a performance indicator corresponding to the configuration model of the database node within data of the database trace.

25. The computer program product of claim 24 further comprising:

mapping, by the computer, the values of the data factors corresponding to the database node to the performance indicator corresponding to the configuration model of the database node; and recording, by the computer, the mapping of the values of the data factors corresponding to the database node to the performance indicator corresponding to the configuration model of the database node for future reference.

* * * * *